June 24, 1924.
R. C. ROTH
1,498,579
SELF CHECKING MOTOR THEFT SIGNAL
Filed Oct. 25, 1923
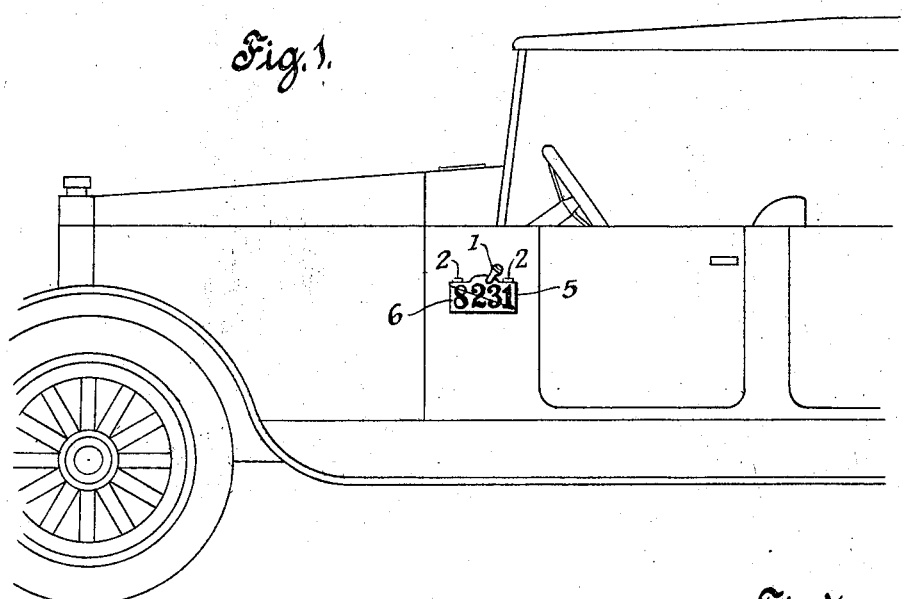
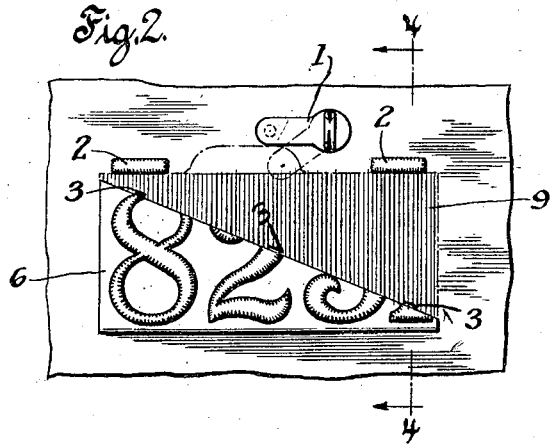
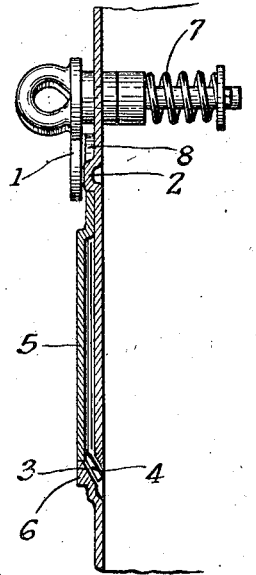
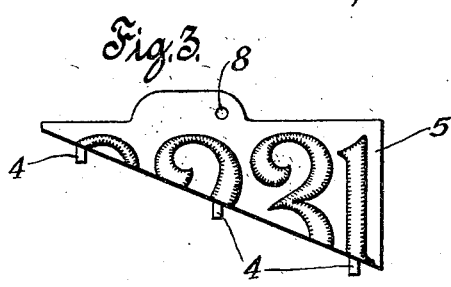
Robert C. Roth INVENTOR
BY
William L. Stout ATTORNEY Patented June 24, 1924.

1,498,579

UNITED STATES PATENT OFFICE.

ROBERT C. ROTH, OF NEW YORK, N. Y.

SELF-CHECKING MOTOR-THEFT SIGNAL.

Application filed October 25, 1923. Serial No. 670,775.

*To all whom it may concern:*

Be it known that I, ROBERT C. ROTH, a citizen of the United States, residing at No. 247 West 69th Street, in the borough of Manhattan, city, county, and State of New York, have invented a new and useful Self-Checking Motor-Theft Signal, and pray that Letters Patent may be granted to me for the improvement set forth in the following specification.

My invention relates to improvements in self checking motor theft signals, its object is to provide a self checking theft indicator or signal on motor cars, trucks, boats or other vehicles, which will indicate, by the absence of a removable portion of the manufacturer's registration number or mark integrally stamped or cast on a loose adjustable metal plate, that possession of such cars, trucks, boats or other vehicles is prima facie unlawful, so as to justify a demand by the police, for the production of the adjustable plate which contains the balance of the registration number or mark or other indicia of title, to prove ownership or lawful possession.

The object of this device and improvement is to permit the owner or lawful occupant of a motor car, truck, boat or other vehicle, when not in use, to remove the loose adjustable plate containing a portion of the manufacturer's registration number or mark, and leave the portion of the registration number or mark stamped on the body of the car, boat or other vehicle, incomplete and conspicuous. The portion of the body of the car, boat or other vehicle beneath the adjustable plate is painted in a vivid color or conspicuously marked so as to attract attention, during the absence of the adjustable plate to the incomplete mark or number.

This I obtain by the following device and combination, to-wit; a section of the manufacturer's registration number or mark is integrally stamped or cast on or permanently attached to some conspicuous part of the motor car, truck, boat or other vehicle, the balance of such registration number or mark being stamped or cast on a removable metal plate, to be affixed to the section of the registration number or mark on the body of the car, boat or other vehicle, and held in place by lugs, bars and a movable spring lug, thus forming and presenting when so affixed, the complete manufacturer's or other registration number or mark.

I obtained these objects by the device and mechanism illustrated in the accompanying drawing in which;

Figure 1 represents a side view of a motor car with the complete assembled registration number in position.

Figure 2 represents a detailed drawing of this security device with the loose adjustable section of the registration number removed.

Figure 3 represents the loose adjustable removable plate, which, when set in place, completes the serial car or vehicle registration number.

Figure 4 represents a cross section of the complete assembled device on the body of a motor car.

Similar numerals refer to similar elements throughout the several views.

Fig. 1 represents the complete assembled registration number in position on a motor car. Although I want it understood that I do not confine myself to any particular position on a motor car or any other vehicle, on which it is placed, or to any particular mark, number, or indicia of title, 6 represents the portion of the registration number, integrally stamped or cast on or permanently affixed to the vehicle. I do not confine myself to any particular method of permanently attaching one section of the registration mark or number to the vehicle, but prefer it being stamped or cast in the body of the vehicle. 2 and 2 are bars permanently attached to the vehicle to keep the removable plate 5 in position. 5 is the removable plate set in position and held in position by bars 2 and 2 and the movable spring lug 1. 1 is a movable spring lug attached to the vehicle, which holds the removable plate 5 in position. 3, 3 and 3 indicate holes in the vehicle into which lugs 4, 4 and 4 of the removable plate 5 fit, when in position. 4, 4, and 4 are lugs of plate 5 which fit into holes 3, 3 and 3 of the vehicle to hold plate 5 securely in position so it cannot slide. 7 is a spring in the back of the movable spring lug 1, which gives free play to it. Movable spring lug 1 has on the lower side of its extremity a pin which, when engaged in hole 8 of the removable plate 5 holds same securely in position. 8 is a hole or depression in the top of the removable plate 5, upon which the pin on the lower side of the extremity of the movable spring lug 1 rests when plate 5 is set in position. 9 represents the space upon which the removable plate 5 rests when in position. Such portion of the vehicle (9) is to be painted in a vivid color or with a conspicuous design, so as to attract the attention by and during the absence of the removable plate 5, and give notice that possession of the vehicle is prima facie unlawful, thereby justifying a demand by the police for the production of the adjustable plate 5, which contains the balance of the registration mark or number, or other indicia of title, to prove ownership or lawful possession.

Having described my invention, what I desire to secure by Letters Patent and I claim are:

1. The combination in a self checking motor theft signal, of a section of a registration mark or number permanently carried by the body of a vehicle, in combination with a removable plate containing the remainder of such permanent registration mark or number, the removable plate being held in position by lugs set in holes in the body of the vehicle and held in position by bars or stops and a removable spring lug attached to the vehicle.

2. The combination in a self checking motor theft signal, of a section of a registration mark or number permanently carried by the body of a vehicle, in combination with a removable plate containing the remainder of such permanent registration mark or number, the removable plate being held in position by lugs set in holes in the body of the vehicle, and held in position by bars or stops and a movable spring lug attached to the vehicle.

3. The combination in a self checking motor theft signal, of a section of a registration mark or number permanently carried by the body of a vehicle, in combination with a removable plate containing the remainder of such permanent registration mark or number, the removable plate being held in position by lugs set in holes in the body of the vehicle, and held in position by bars or stops and a movable spring lug attached to the vehicle, said movable spring lug having on the lower side of its extremity a pin, which, when engaged in a hole or depression on the top of the removable plate holds same in position.

Signed at the borough of Manhattan, city, county and State of New York, this 12th day of March, one thousand nine hundred and twenty-four.

ROBERT C. ROTH.